United States Patent
Gerber et al.

(10) Patent No.: US 6,781,941 B1
(45) Date of Patent: Aug. 24, 2004

(54) FIELD SERVICEABLE LASER PEN FOR OPTICAL DISK DRIVES

(75) Inventors: Ronald E. Gerber, Richfield, MN (US); George R. Gray, Apple Valley, MN (US); Edward C. Gage, Apple Valley, MN (US); Shubhagat Gangopadhyay, Chanhassen, MN (US)

(73) Assignee: Seagate Technology LLC, Pittsburgh, PA (US)

( * ) Notice: Subject to any disclaimer, the term of this patent is extended or adjusted under 35 U.S.C. 154(b) by 0 days.

(21) Appl. No.: 09/357,781

(22) Filed: Jul. 21, 1999

Related U.S. Application Data
(60) Provisional application No. 60/128,748, filed on Apr. 12, 1999.

(51) Int. Cl.$^7$ ................................................ G11B 7/00
(52) U.S. Cl. ............................ 369/112.01; 369/112.27; 369/121; 369/13.24
(58) Field of Search ............................... 369/116, 121, 369/44.11, 44.14, 112.01, 112.18, 112.19, 112.21, 112.27, 34, 36, 40, 13.24, 13.29, 13.32, 13.33, 13.34

(56) References Cited

U.S. PATENT DOCUMENTS

| | | | | |
|---|---|---|---|---|
| 5,388,086 A | * | 2/1995 | Yamasaki et al. | 369/44.14 |
| 5,404,009 A | * | 4/1995 | Kando et al. | 369/112.07 |
| 5,631,893 A | * | 5/1997 | Kang et al. | 369/44.18 |
| 5,940,549 A | * | 8/1999 | Wilde et al. | 385/15 |
| 5,974,019 A | * | 10/1999 | Belser et al. | 369/44.14 |
| 6,108,088 A | * | 8/2000 | Drake et al. | 356/372 |
| 6,212,151 B1 | * | 4/2001 | Heanue et al. | 369/44.23 |
| 6,226,233 B1 | * | 5/2001 | McDaniel et al. | 369/13 |

\* cited by examiner

*Primary Examiner*—Thang V. Tran
(74) *Attorney, Agent, or Firm*—Dorsey & Whitney LLP

(57) ABSTRACT

A laser source is located in a relatively cool accessible location. Because there is adequate heat dissipation for the laser source, changes in the laser wavelength that arise from laser temperature changes are minimized. The invention described here includes the use of optical fiber to deliver light from the laser source. The laser reliability is improved because of reduced temperature and temperature fluctuations are experienced by the laser source. Because the laser source can be placed outside the drives hermetic seal, the laser can be easily replaced in the field, if required.

29 Claims, 4 Drawing Sheets

FIELD SERVICEABLE LASER PEN FOR OPTICAL DISK DRIVES

RELATED APPLICATIONS

The present application is related to and claims priority from Provisional Application Ser. No. 60/128,748, filed Apr. 12, 1999, and is incorporated herein by reference.

FIELD OF THE INVENTION

The present invention is generally related to the use of optical drive laser sources and is more specifically related to the use of optical drive laser sources in relatively low temperature and/or low temperature variation environments.

BACKGROUND

In virtually all optical disk drives to date, light is provided by a source laser located inside the drive. The laser is located in a physically warm place inside the drive and is fairly inaccessible. In such prior art drives a great deal of effort is devoted to providing adequate heat dissipation such that heat buildup and/or heat variations within the optical drive will not affect the operating wavelength of the laser. Heat buildup and/or heat variations may likewise shorten the lifetime of the laser, which would then require significant effort to remove and replace from within the sealed enclosure that it is disposed.

What is needed, therefore, is a method and apparatus such that the aforementioned limitations of the prior art are addressed.

SUMMARY OF THE INVENTION

The present invention provides a laser source that is not exposed to the heat and heat variations within the housing of an optical disk drive. The laser source may, consequently, exhibit better performance characteristics for a given cost over that of the prior art. Furthermore, the present invention does not require opening of the optical disk drive housing for replacement and/or service, and thus reduces the costs associated therewith.

The present invention comprises an optical drive including: at least one optical head; at least one source of light for delivering light to the optical head; and a housing; wherein the at least one optical head is disposed within the housing and wherein the at least one source of light is disposed outside the housing.

The at least one source of light may comprise a diode laser source such as Fabry Perot laser source or a stable single frequency laser source.

The optical drive may further comprise at least one optical fiber, wherein the at least one optical fiber is disposed in an optical path between the at least one optical head and the at least one source of light for directing the light between the at least optical head and the at least one source of light.

The optical drive may further comprise an optical switch, wherein the optical switch is disposed in the optical path for directing the light between the at least one optical head and the at least one source of light.

The optical fiber may comprise a single-mode optical fiber, a single mode polarization maintaining optical fiber, or a low birefringence optical fiber.

The at least one optical head may consist of one optical head.

The at least one optical fiber may consist of one optical fiber.

The housing may comprise a standardized form factor.

The optical head may comprise a flying optical head.

The optical head may comprise a magneto-optical head.

The present invention may comprise an optical drive, including: a housing; at least one optical head; light delivery means for delivering light to the at least one optical head with minimized wavelength fluctuations.

The means for delivering the light nay be disposed outside the housing.

The present invention includes a method for delivering light to an optical head of an optical drive, comprising the steps of: disposing an optical head with an optical drive housing; disposing a source of the light in a location that comprises a relatively cool and/or stable temperature; and directing the light between the optical head and the source of light.

The present invention may further comprise the step of disposing the source of light outside the optical drive housing.

DETAILED DESCRIPTION OF THE INVENTION

Figure 1:
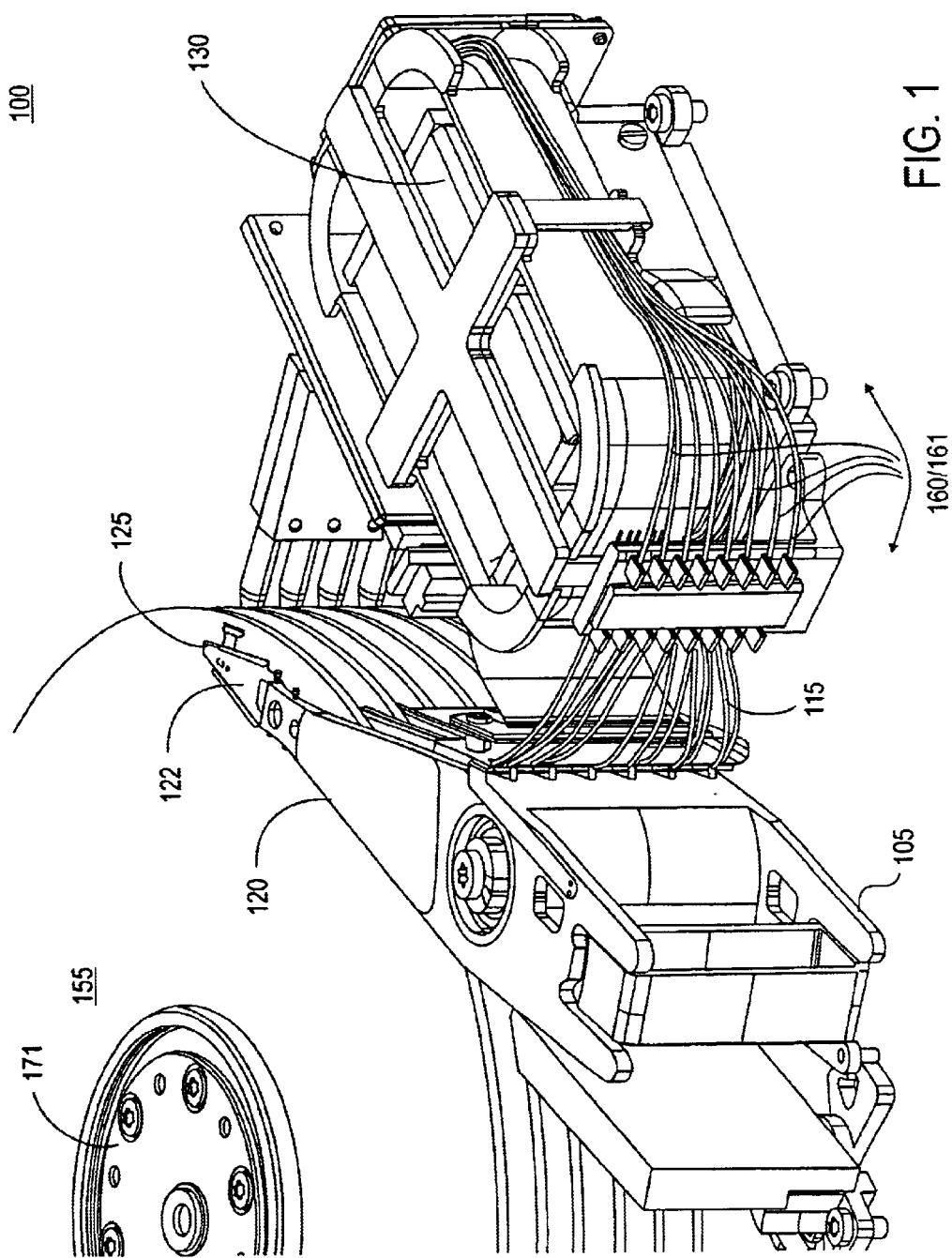
In FIG. 1 a perspective view of a multi-disk optical drive 100.

Referring in detail to the drawings wherein similar parts are identified by like reference numbers, there is seen in FIG. 1a perspective view of a multi-disk optical drive 100. In this view it is seen that a head assembly 105 may comprise individual optical heads 125, each of which is coupled to individual arms 120 through respective suspensions 122. In one embodiment, the optical heads 125 may comprise flying optical heads. Flying optical heads are understood to comprise air bearing surfaces that interact to aerodynamically maintain the optical heads 125 a distance above respective rotating disks 155. In other embodiments, the optical heads 125 may comprise magneto-optical heads. The rotating disks 155 are rotated at a high speed, for example 10,000 RPM, by a high speed spindle motor assembly 171. FIG. 1 further illustrates a group of individual optical fibers 115, which are all coupled to an optical switch 130 at one end and to individual ones of the optical heads 125 at an opposite end. The optical switch 130 selectively directs light 160/161 between a laser source (which is discussed below) and a particular one of the individual optical fibers 115. The optical fibers 115 direct the light 160/161 between the optical switch 130 and a particular optical head 125.

Figure 2:
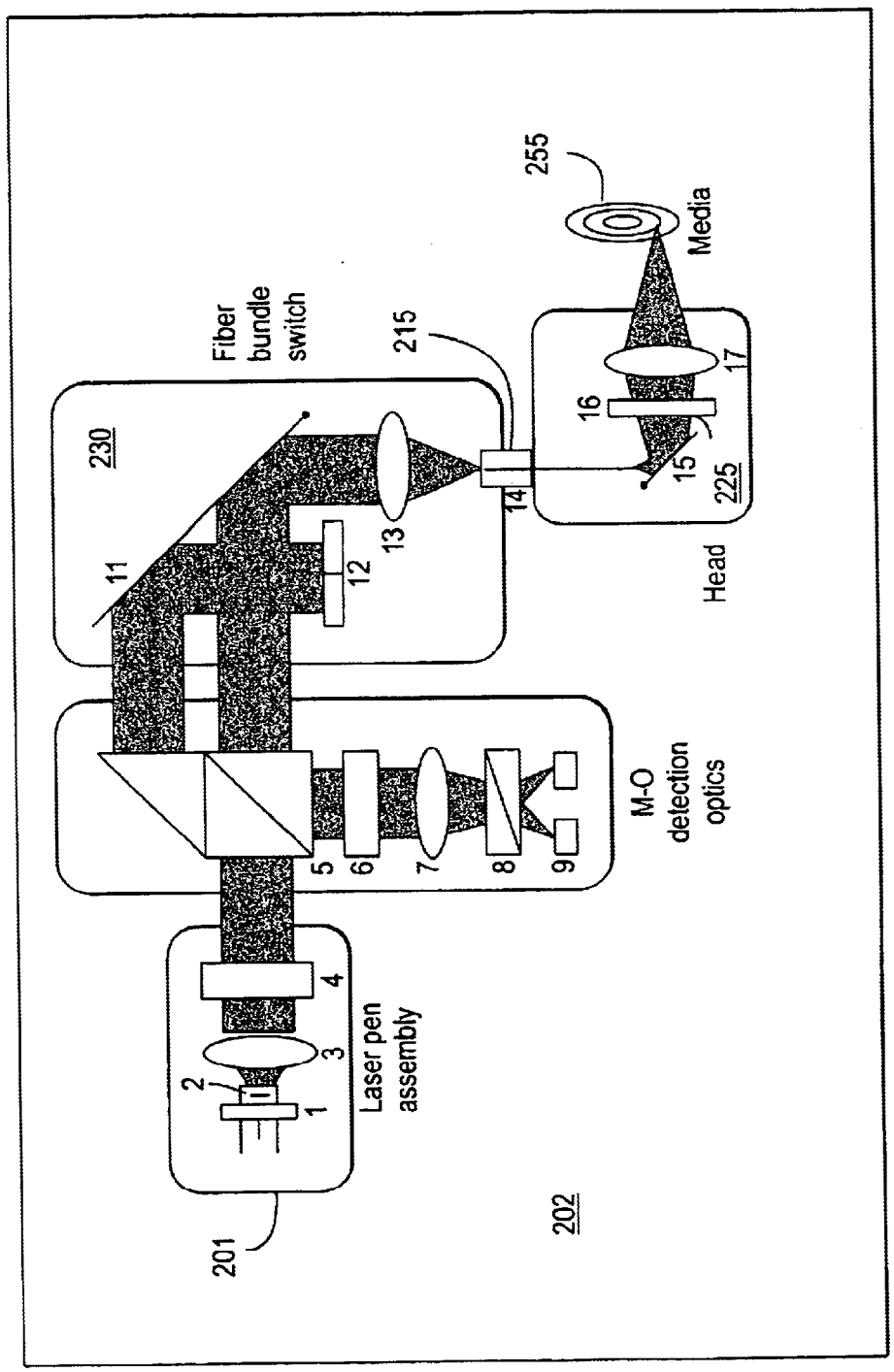
In FIG. 2 there is seen a diagram of the prior art, wherein a laser source 201 provides a source of light from within a housing 202 of an optical drive.

Referring now to FIG. 2, there is seen a diagram of the prior art, wherein a laser source 201 provides a source of light from within a housing 202 of an optical drive. In the prior art the laser source 201 is in close proximity to the optical switch 230. The light 161 from the laser source 201 is delivered as a collimated beam. The collimated light is directed by the optical switch 230 to a particular optical fiber 215 and by the fiber to a particular optical head 225. The particular optical head 225 directs the light 162 to a respective disk 255. The light is reflected back from the disk 255 towards the head 225, and is directed from the optical head 225 by the optical fiber 215 towards the optical switch 230. Properties of the reflected light 162 are detected using various optical detection techniques which are well known in the art for the particular optical disk technology utilized, for example, magneto-optical, optical, etc.

In prior art drives, significant heat is generated by various components of the optical drive, for example, by the spindle motor, the electronic drive circuitry, as well as the laser source itself. This heat causes the temperature within a sealed housing 202 which the optical drive components are disposed to be raised to a temperature which is significantly above the ambient temperature outside the housing. The ambient temperature outside of the housing can vary between 5 and 45 degrees Celsius. However, even if the air flow within the housing 202 is vented, the temperature range within the housing of prior art optical drives can vary as much as between 5 and 70 degrees Celsius. It is understood, therefore, that a high temperature and/or temperature variations can act to degrade the performance as well as the lifetime of the laser source 201.

Figure 3:
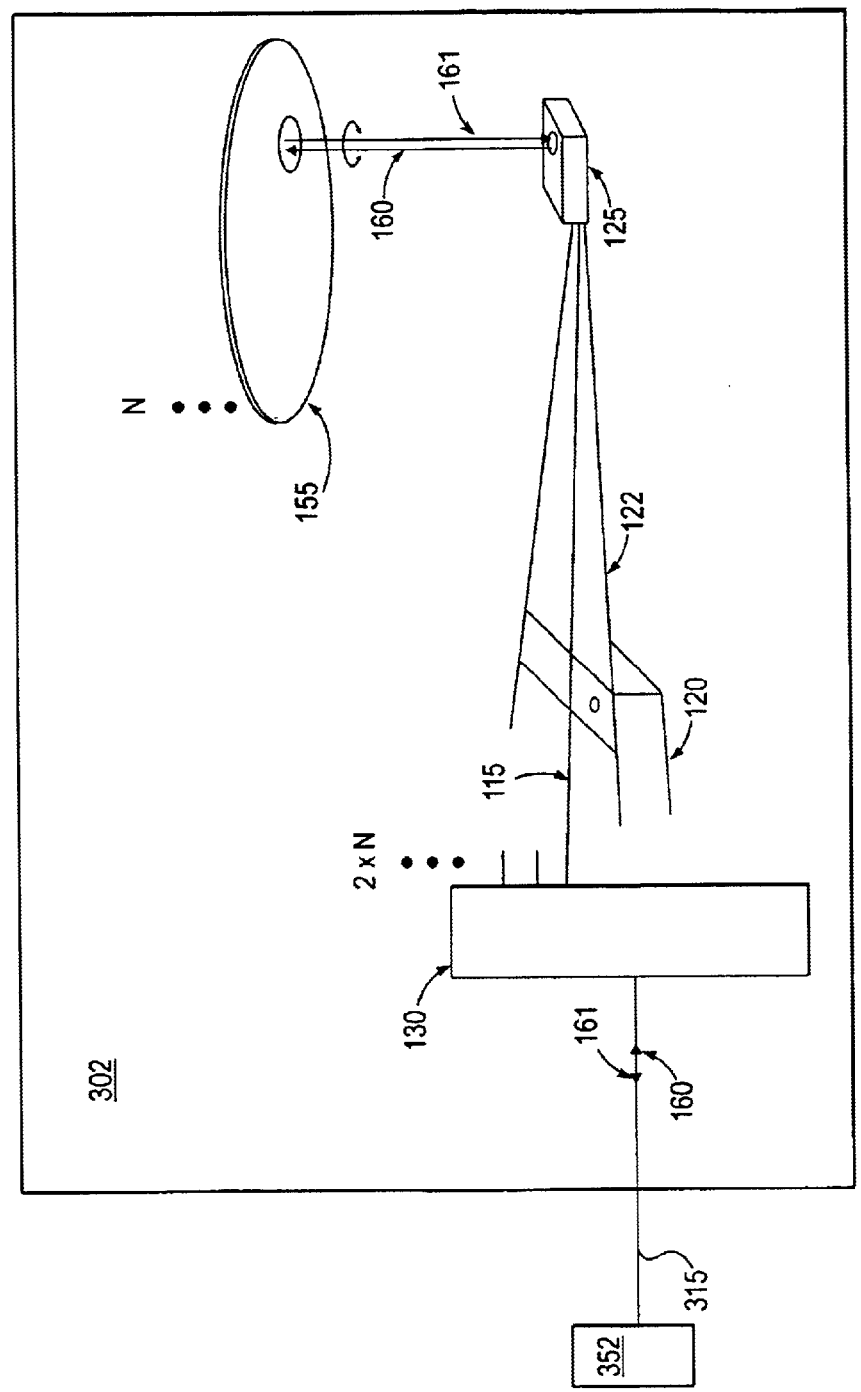
In FIG. 3 there is seen a laser source 352 of the present invention.

Referring now to FIG. 3, there is seen a laser source 352 of the present invention. The present invention utilizes the laser io source 352 to provide a source of light to the optical drive 100 in a new and novel manner. To this end, in the present invention the laser source 352 is located outside a housing 302 comprising the optical disk drive 100. Such housings are well known in the art and comprise various standardized form factors, for example, a half height form factor, etc, within which may be disposed disks of various radii, for example, 5 inches, 3.5 inches, etc. By placing the laser source 352 outside of the optical disk drive housing 302 it is understood that the laser source 352 would be easy to replace and/or service in the event that it were to fail. In the prior art this approach has not been considered for a number of reasons, one in particular being, that a means for accurate alignment for directing the light towards the head 125 and/or back from the head 125 has not existed. The present invention identifies that an optical fiber 115 of the type disclosed in FIG. 1, which is used to direct the light 160/161 between the optical switch 130 and the optical heads 125, can also be used to accurately direct light between the laser source 352 and the optical switch 130. Accordingly, in one embodiment of the present invention an optical fiber 315 is disposed between the laser source 352 and the optical switch 130. The optical fiber 315 may be routed from outside of the housing 302 to within the housing through a suitably dimensioned aperture. The optical fiber 315 enables routing of the light between the laser source 352 and the optical switch 130 along an optical path that can be aligned accurately and with little effort. The laser source 352 that is thus used can have looser tolerances (and is thus can be less expensive than the prior art laser sources) because it is not exposed to the heat and heat variations within the housing 302 of the optical drive 100. It is understood that detection of the return laser light 161 may be done by placing a beam splitter and appropriate detection optics and circuitry (not shown) in the optical path before or after the optical fiber 315.

Figure 4:
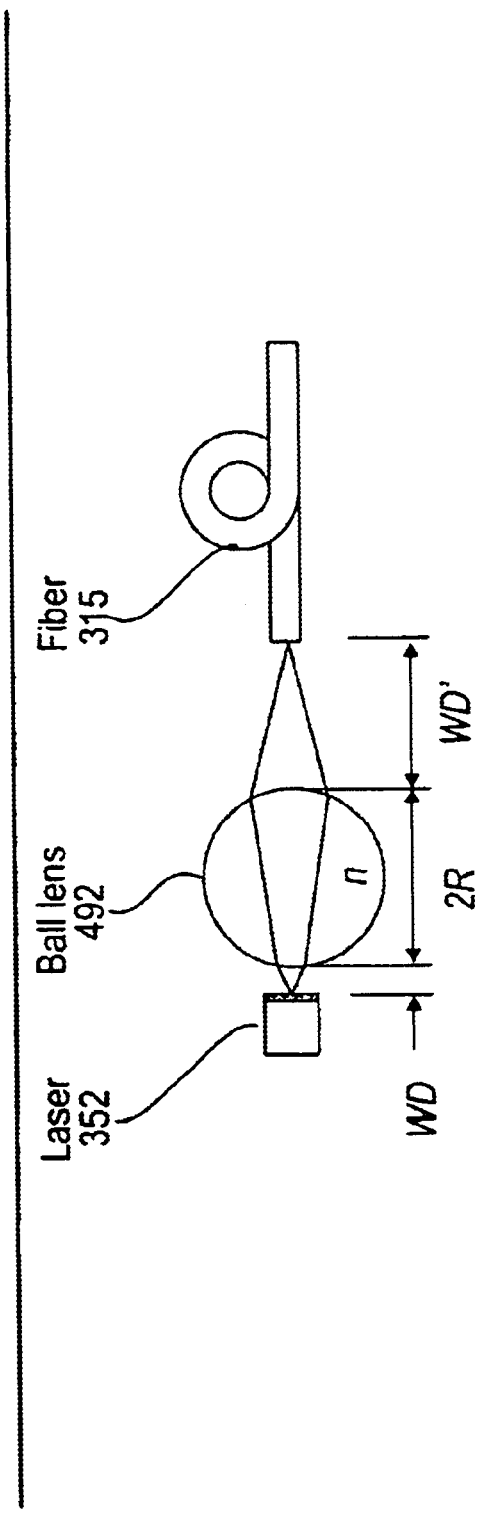
In FIG. 4 there is seen a lens disposed between the laser source 352 and the optical fiber 315.

Referring now to FIG. 4, there is seen a lens disposed between the laser source and the optical fiber. In one particular embodiment, a ball lens 492 may be used to focus light from the laser source 352 onto the optical fiber 315 because it can be manufactured and/or procured cheaply. It is understood, however, that any other suitable lens design could be used to focus the light from the laser source 352. The laser source 352, lens 492, and optical fiber 315 may be coupled together on a suitable substrate and mounted on a thermoelectric cooler if so desired.

It is understood that the particular laser source 352 selected can vary depending upon particular system requirements and can be selected to be a conventional Fabry Perot laser source or stable single frequency laser source. Stable frequency laser sources include distributed feedback laser sources (DFB) or distributed Bragg reflector sources (DBR).

It is understood, that in a magneto-optical embodiment, the optical fiber 315 would preferably be of a variety that can accurately convey polarization orientations of data bits stored on the disks 155. In one magneto-optical embodiment, the optical fibers 115/315 may be single mode polarization maintaining optical fibers, while in other embodiments, the optical fibers 115/315 may be single mode or low-birefringence optical fibers.

It is also understood, that in a single optical head and single disk embodiment (not shown) the optical switch 130 would not necessarily be required. In such an embodiment, only one optical fiber 315 would be needed to direct the light between the laser source 352 and the optical head 125.

It is further understood, that in a two optical head and single disk embodiment (not shown) the optical switch 130 would also not necessarily be required. In such an embodiment two optical fibers 315 could be used to direct light between two laser sources 352 and their respective optical heads 125. In such an embodiment, the cost of using two laser sources may be less than the cost of using the optical switch. It is understood that these concepts can be extended to any number of disks and laser sources.

In addition, while the present invention has been described to include placement of a laser source 352 outside of a disk drive housing 302, it is understood that the optical fiber 315 could be used to route light from a laser source located at some relatively low and/or stable temperature location within the housing 302.

Accordingly, while the present invention has been described wherein with reference to particular embodiments thereof, a latitude of modification, various changes, and substitutions are intended with the present invention, and it will be appreciated that in some instances some features of the invention will be employed without a corresponding use of other features without departure from the scope of the invention.

What is claimed is:

1. An optical drive comprising:
   at least one optical head;
   a recording medium;
   at least one source of light for delivering light to said at least one optical head; and
   a housing, wherein said at least one optical head and said recording medium are disposed within said housing and wherein said at least one source of light is disposed outside of said housing.

2. The optical drive of claim 1, wherein said at least one source of light comprises a laser source.

3. The optical drive of claim 2, wherein said laser source comprises a Fabry Perot diode laser source.

4. The optical drive of claim 2, wherein said diode laser source comprises a stable single frequency diode laser source.

5. The optical drive of claim 1, further comprising an optical fiber for coupling said at least one source of light to said housing.

6. The optical drive of claim 1, further comprising an optical switch, wherein said optical switch is disposed between said at least one optical head and said at least one source of light.

7. The optical drive of claim 5, wherein said optical fiber comprises a single-mode polarization maintaining optical fiber.

8. The optical drive of claim 5, wherein said optical fiber comprises a low birefringence optical fiber.

9. The optical drive of claim 5, wherein said optical fiber comprises a single-mode optical fiber.

10. The optical drive of claim 6, wherein said optical switch is disposed within said housing.

11. The optical drive of claim 1, wherein said at least one optical head consists of one optical head.

12. The optical drive of claim 1, wherein said housing comprises a standardized form factor.

13. The optical drive of claim 1, wherein said at least one optical head comprises a flying optical head.

14. The optical drive of claim 1, wherein said at least one optical head comprises a magneto-optical head.

15. An optical drive, comprising:
   a housing;
   at least one optical head and a recording medium disposed inside said housing; and
   light delivery means for delivering light to said at least one optical head, said light delivery means being disposed outside said housing so as to minimize wavelength fluctuations in said light delivery means.

16. The optical drive of claim 15, further comprising an optical fiber for coupling said light delivery means to said housing.

17. The optical drive of claim 15, wherein said light delivery means is a laser source.

18. A method for delivering light to an optical head of an optical drive, comprising the steps of:
   disposing an optical head and a recording medium within an optical drive housing;
   disposing a source of said light outside said optical drive housing; and
   directing said light between said optical head and said source of light.

19. The method for delivering light of claim 18, further comprising the step of coupling said source to said housing with an optical fiber.

20. An optical drive comprising:
   an optical switch;
   an optical head;
   a light source for delivering light to said optical head;
   a first optical fiber for coupling said light source to said optical switch;
   a second optical fiber for coupling said optical switch to said optical head; and
   a housing, wherein said optical switch is disposed within said housing and said light source is disposed outside of said housing.

21. An optical drive according to claim 20, wherein said housing is provided with an aperture and said first optical fiber passes through said aperture.

22. An optical drive according to claim 20, wherein said light source is a laser source.

23. An optical drive according to claim 22, wherein said laser source is a Fabry Perot diode laser source.

24. An optical drive according to claim 23, wherein said diode laser source is a stable single frequency diode laser source.

25. An optical drive according to claim 20, wherein said first and second optical fibers are single-mode polarization maintaining optical fibers.

26. An optical drive according to claim 20, wherein said first and second optical fibers are low birefringence optical fibers.

27. An optical drive according to claim 20, wherein said first and second optical fibers are single-mode optical fibers.

28. An optical drive according to claim 20, wherein said optical head is a flying optical head.

29. An optical drive according to claim 20, wherein said optical head is a magneto-optical head.

* * * * *